United States Patent
Spiering

[11] Patent Number: 5,900,942
[45] Date of Patent: May 4, 1999

[54] MULTI SPECTRAL IMAGING SYSTEM

[75] Inventor: Bruce A. Spiering, Long Beach, Miss.

[73] Assignee: The United States of America as represented by Administrator of National Aeronautics and Space Administration, Washington, D.C.

[21] Appl. No.: 08/938,300

[22] Filed: Sep. 26, 1997

[51] Int. Cl.⁶ .................................................. G01B 11/00
[52] U.S. Cl. .......................... 356/400; 348/188; 348/263; 359/618
[58] Field of Search ..................... 356/399–401, 356/435; 348/188, 263, 189–192, 94–95, 92, 133.1, 176, 33; 382/294–297; 359/618, 754

[56] References Cited

U.S. PATENT DOCUMENTS

| | | |
|---|---|---|
| 3,293,357 | 12/1966 | Yoshikazu Doi et al. . |
| 4,081,215 | 3/1978 | Penney et al. . |
| 4,134,683 | 1/1979 | Goetz et al. . |
| 4,519,707 | 5/1985 | Kuffer . |
| 4,599,001 | 7/1986 | Richard . |
| 4,678,917 | 7/1987 | Helms et al. . |
| 4,743,112 | 5/1988 | Burke . |
| 4,751,571 | 6/1988 | Lillquist . |
| 4,790,654 | 12/1988 | Clarke . |
| 4,998,284 | 3/1991 | Bacus et al. . |
| 5,044,727 | 9/1991 | Steinle . |
| 5,130,545 | 7/1992 | Lussier . |
| 5,146,482 | 9/1992 | Hoover . |
| 5,225,893 | 7/1993 | Whitney et al. . |
| 5,276,321 | 1/1994 | Chang et al. . |
| 5,300,778 | 4/1994 | Norkus et al. . |
| 5,305,093 | 4/1994 | Dosmann . |
| 5,377,003 | 12/1994 | Lewis et al. . |
| 5,420,681 | 5/1995 | Woodruff . |
| 5,473,438 | 12/1995 | Keranen et al. . |
| 5,528,368 | 6/1996 | Lewis et al. . |
| 5,539,518 | 7/1996 | Bennett . |
| 5,539,577 | 7/1996 | Si et al. . |

Primary Examiner—K. P. Hantis
Attorney, Agent, or Firm—Beth A. Vrioni

[57] ABSTRACT

An optical imaging system provides automatic co-registration of a plurality of multi spectral images of an object which are generated by a plurality of video cameras or other optical detectors. The imaging system includes a modular assembly of beam splitters, lens tubes, camera lenses and wavelength selective filters which facilitate easy reconfiguration and adjustment of the system for various applications. A primary lens assembly generates a real image of an object to be imaged on a reticle which is positioned at a fixed length from a beam splitter assembly. The beam splitter assembly separates a collimated image beam received from the reticle into multiple image beams, each of which is projected onto a corresponding one of a plurality of video cameras. The lens tubes which connect the beam splitter assembly to the cameras are adjustable in length to provide automatic co-registration of the images generated by each camera.

16 Claims, 1 Drawing Sheet

MULTI SPECTRAL IMAGING SYSTEM

ORIGIN OF THE INVENTION

The invention described herein was made by an employee of the United States Government and may be manufactured and used by or for the Government for Government purposes without the payment of any royalties thereon or therefor.

BACKGROUND OF THE INVENTION

The present invention relates in general to an imaging system for providing co-registered images of objects to a plurality of separate cameras, detectors or other optical imaging devices.

Numerous imaging applications require generation of multiple, co-registered images to facilitate multi spectral analysis thereof. As an example, stress in growing plants can be monitored, in part, by observing variations of the plant's reflectance of a specific radiation wavelength, 700 nm, which is readily absorbed by chlorophyll. If the plant is under stress, its chlorophyll production decreases, and its absorption of 700 nm wavelength radiation also decreases. Relative levels of chlorophyll in a plant can therefore be determined by measuring the plant's reflectance to 700 nm wavelength radiation. However, other environmental factors, such as ambient light level, also affect the plant's reflectance characteristics. Thus, the plant's reflectance to a reference wavelength, which is not affected by variations in chlorophyll production, must also be employed as a comparison standard. This necessitates the generation of two co-registered images of the plant, one of which is limited to light having a wavelength of 700 nm, and the other of which is limited to the reference radiation wavelength. By analyzing the ratio of the two reflectances, a determination of the chlorophyll production in the plant can be made.

In other situations, it is desirable to combine different types of images to provide the observer with more visual information. For example, optical fire detectors employed by NASA at the Kennedy Space Center employ infrared responsive image detectors to detect hydrogen flames because such flames are invisible to the naked eye. The infrared images cannot, however, provide a visible indication of the actual location of a detected fire. Thus, a visible spectrum image of the monitored area must be overlaid with the infrared image to provide this information.

Previous techniques for generating multi spectral co-registered images typically rely on the use of single element detectors with either scan mirrors or sensor motion relative to the target to produce a two-dimensional multi spectral image. The image of a single picture or image element, i.e., pixel, is focused on a field stop, re-expanded by a collimator, wavelength dispersed by means of beam splitters, dichroic mirrors, prisms, gratings, etc., and refocused onto single element detectors. The signal from each of these detectors is simultaneously digitized and stored as digital data. Each image pixel then consists of a data value for each wavelength. Since the image can only be formed by scanning sequentially, none of the pixels are coincident in time, or as in the case of a linear array of detectors, no two lines of the image are coincident in time. This requires post processing by a computer and software with significant data storage capability, or some special processor to process the data and form an image for presentation to an end user. Furthermore, even if the optical elements in one of these systems were specifically configured so that the resulting images could be easily combined, any reconfiguration of the lenses, beam splitters and filters would require a substantial redesign of the system components.

In view of the foregoing, a need therefore exists for an optical imaging system which generates co-registered multi spectral images without the need for extensive data processing, and at the same time permits reconfiguration of lenses, beam splitters and filters without redesigning the system components.

SUMMARY OF THE INVENTION

The present invention fulfills the foregoing need through provision of a multi spectral optical imaging system which produces automatically co-registered multiple images, and uses conventional off-the-shelf components to facilitate easy reconfiguration of the system for a wide variety of applications. To provide automatic co-registration of the generated images, a primary lens system is employed for generating a real image of an object to be imaged at a fixed focal point, regardless of the position of the object relative to the primary lens system. The real image is projected through a collimating lens which forms a collimated image beam. The collimated image beam is directed through a beam splitter assembly which forms the desired number of image beams for the particular application. From the beam splitter assembly, the image beams are directed through adjustable length tubes to a camera lens and camera, or other suitable two-dimensional optical imaging device.

In the preferred embodiment, the distance from the object real image, which is preferably formed on a reticle, to each camera lens is selectively adjusted by adjusting each tube length to insure co-registration of the received object images. This enables the system to generate co-registered images of any objects, regardless of their distance from the focusing lens. In addition, interchangeable camera lenses and wavelength selective filters can be employed for varying the wavelength response range and image magnification for each camera. To provide additional fine tuning adjustments for the system, a mount is provided for each camera which allows rotational adjustment of the camera relative to the received image.

BRIEF DESCRIPTION OF THE DRAWING

The features and advantages of the present invention will become apparent from the following detailed description of a preferred embodiment thereof, taken in conjunction with the accompanying drawing figure, FIG. 1, which is a schematic diagram illustrating a multi spectral imaging system constructed in accordance with a preferred embodiment of the present invention.

DETAILED DESCRIPTION OF THE PREFERRED EMBODIMENT

Figure 1:
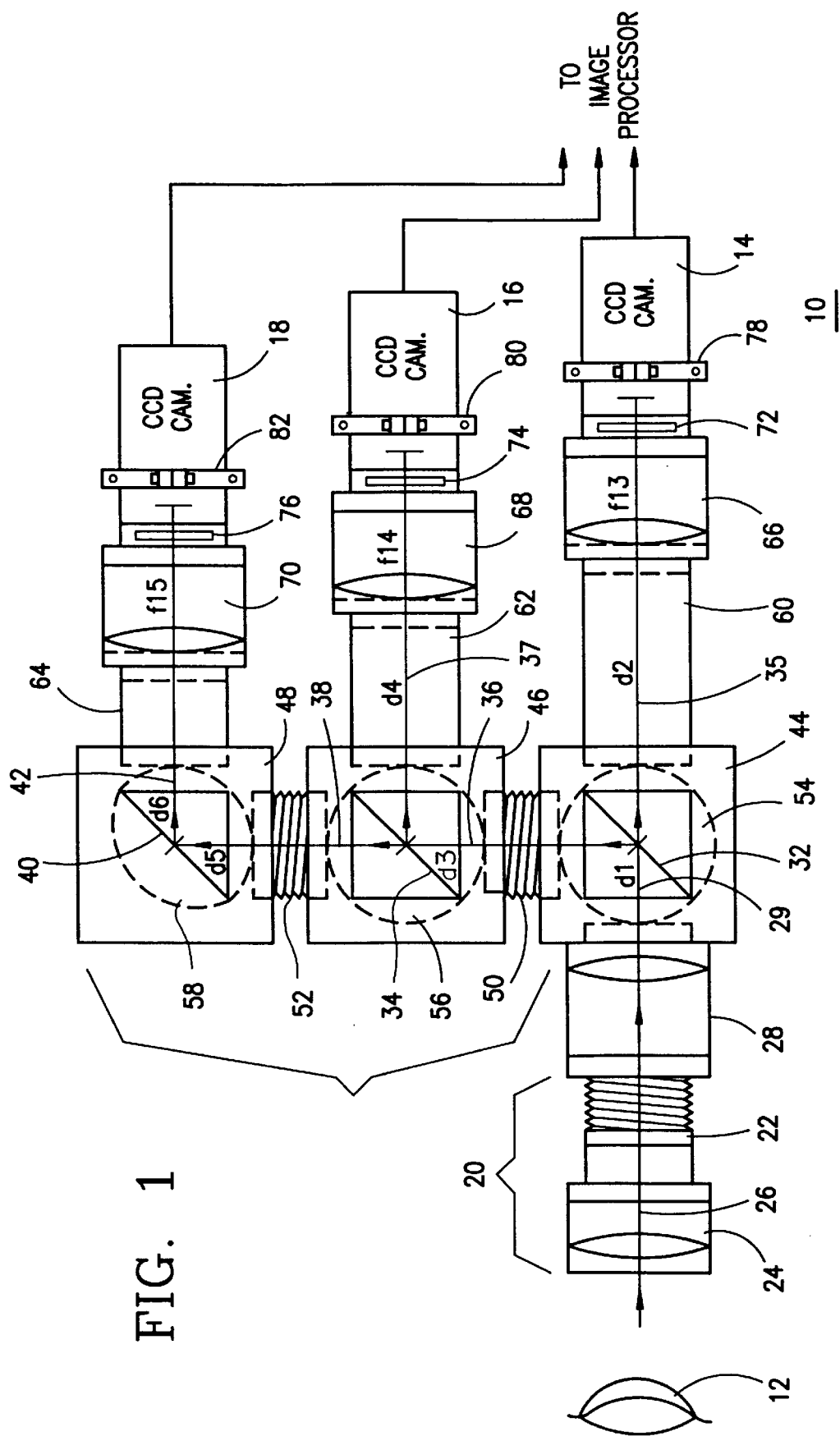

With reference to FIG. 1, a multi spectral imaging system 10 is illustrated for generating a plurality of co-registered images of an object 12 in accordance with the preferred embodiment of the present invention. The system 10 employs first, second and third CCD video cameras 14, 16 and 18, each of which detects an image of the object 12, and generates an electrical representation thereof. Although the use of CCD video cameras is preferred, it will of course be understood that any other type of two-dimensional imaging device or detector may be employed. In addition, while the embodiment of the invention illustrated in FIG. 1 employs three cameras, it will be understood that the invention may be employed to generate images for any number of optical imaging devices or detectors.

The system 10 includes a primary lens assembly 20 comprised of a reticle 22 and a focusing lens 24. The focusing lens 24 focuses an incoming image beam 26 onto the reticle 22, thereby forming a real image of the object 12 thereon. The primary lens assembly 20 is threaded into a collimating lens 28 which re-expands or collimates the projected object image into a collimated image beam 29 that is directed into a beam splitter assembly 30. It should be noted that the reticle 22 is positioned at the focal point of the focusing lens 24 and the collimating lens 28.

The beam splitter assembly 30 includes first and second beam splitters 32 and 34 for splitting the collimated image beam 29 into first, second, third and fourth image beams 35, 36, 37 and 38. The first image beam 35 is a version of the image beam 29 which is transmitted through the first beam splitter 32, while the second image beam 36 is reflected off of the first beam splitter 32 at a 90° angle. The third image beam 37 is reflected off of the second beam splitter 34 as a reversed version of the second image beam 36, and is thus a twice reflected version of the original collimated image beam 29. Finally, the fourth image beam 38 is the portion of the second image beam 36 which is transmitted through the second beam splitter 34. A fold mirror 40 reflects the fourth image beam 38 at a 90° angle, thereby generating a fifth image beam 42 which, having also been twice reflected, is of the same orientation as the original collimated image beam 29. The fold mirror 40 is thus necessary to restore the object image to its correct orientation since the second and fourth image beams 36 and 38 constitute once reflected, and therefore reversed, versions of the object image beam 29.

In the preferred embodiment, the beam splitter assembly 30 is a modular assembly that is constructed from a plurality of cubes 44, 46 and 48 which are connected to one another by means of first and second threaded couplers 50 and 52. The beam splitters 32 and 34, and fold mirror 40 are mounted on first, second and third circular mounts 54, 56 and 58, respectively, which provide rotational adjustment within the respective cube, as well as roll, pitch and translational adjustments.

First, second and third lens tubes 60, 62 and 64 are provided for directing the first, third and fifth image beams 35, 37 and 42, respectively, to the corresponding CCD cameras 14, 16 and 18. The first tube 60 is threaded into an aperture in the first cube 44; the second tube 62 is threaded into an aperture in the second cube 46; and the third tube 64 is threaded into an aperture in the third cube 48. The length of each of the tubes 60, 62 and 64 is selected to provide the total image beam path length which is necessary to provide co-registered images of the object 12 to each of the cameras 14, 16 and 18.

The opposite ends of the tubes 60, 62 and 64 are threaded into a corresponding one of first, second and third camera lenses 66, 68 and 70, each of which is attached to a corresponding one of the CCD cameras 14, 16 and 18. Disposed between each of the lenses 66, 68 and 70, and the corresponding one of the cameras 14, 16 and 18, are first, second and third optional filters 72, 74 and 76, respectively, each of which provides selective wavelength filtering of the received images. Typically, the filters 72, 74 and 76 are bandpass filters which pass only a single wavelength or small range of wavelengths. However, it will of course be understood that any other type of filter, such as long pass, short pass or band reject, could be employed depending on the application. It should also be noted that the filters 72, 74 and 76 could be located anywhere along the paths of the first, third and fifth image beams 35, 37 and 42.

As an alternative to employing the wavelength selective filters 72, 74 and 76, the beam splitters 32 and 34 can also be designed to perform this additional function. While a typical beam splitter transmits a percentage of an incoming beam equal to the percentage of the reflected beam in a 50/50 ratio, other ratios can also be employed. In addition, although beam splitters are generally independent of wavelength, dichroic mirrors can also be employed in the beam splitters 32 and 34, as well as in the fold mirror 40, which are wavelengths specific as to reflectance and transmittance. Thus, with a dichroic mirror, all of a first range of wavelengths may be transmitted, while all of a second, different range of wavelengths may be reflected so that no energy is lost in the beam splitting process for the specific wave band. The use of dichroic mirrors in the beam splitters 32 and 34, as well as in the fold mirror 40, can therefore serve the same purpose as the filters 72, 74 and 76.

The modular assembly of the system 10 facilitates easy reconfiguration to accommodate any desired application. Off-the-shelf components are preferably employed for each of the system elements to facilitate this reconfiguration. By way of example, many of the system components can be purchased from Thorlabs, Inc. of Newton, N.J. The Thorlabs part numbers which correspond to a number of the system elements are listed in the table below:

| System Element | Thorlabs Part Number |
| --- | --- |
| Cubes 44, 46, 48 | C4W |
| Couplers 50, 52 | SM1T2 |
| Rotational Mounts 54, 56, 58 | B4C |
| Lens Tubes 60, 62, 64 | SM1 Series (e.g., SM1LO5, SM1L10, SM1L20, SM1V10) |

Each of the lens tubes 60, 62 and 64 can be formed from a plurality of the Thorlabs SM1 series tubes to achieve the desired length. To provide precise adjustability of the tube length, the SM1V10 tube is preferably employed which is comprised of two sections that are threaded together, and facilitate tube length adjustment by turning one section relative to the other. It will of course be understood that any other type of telescoping tube arrangement could also be employed to achieve the necessary tube length adjustability.

Other elements of the system 10 are also conventional optical elements which can be purchased, for example, from Edmund Scientific or Computar. For example, the beam splitters, 32 and 34 may be Edmund Scientific Model No. C32, 701, while the fold mirror 40 may be an Edmund Scientific Model No. C32, 552. The various lenses in the system 10, including the focusing lens 24, the collimating lens 28, and the three camera lenses 66, 68 and 70 can be Computar Model No. V5013 lenses. In this regard, it should be noted that although, for the sake of clarity, FIG. 1 illustrates the various lenses as incorporating only a single lens element, in actuality, such lenses typically include a number of series arranged lens elements.

Referring once again to FIG. 1, the path lengths of the image beams 35, 36, 37, 38 and 42 are selected to insure that the images received by each of the CCD cameras 14, 16 and 18 are co-registered with one another. In the case where each of the cameras is identical and no selective wavelength filtering is employed, the distance from the collimating lens 28 to each of the camera lens assemblies 66, 68 and 70 must be identical to achieve co-registration of the images. As illustrated in FIG. 1, the lengths of the various image beams 29, 35–38 and 42 are denoted by d1, d2, d3, d4, d5 and d6, respectively. Thus, in this scenario, d1+d2 must equal d1+d3+d4, and must also equal d1+d3+d5+d6. This of course assumes that the focal lengths of each of the lenses 66, 68 and 70 labeled f13, f14 and f15, respectively, are also identical to one another.

If the filters 72, 74 and 76 are employed, and have different characteristics from one another, this will change the focal lengths f13, f14 and f15. In this case, the image beam path lengths must be adjusted to obtain the necessary co-registration of the received images. To provide this adjustment, the lengths d2, d3, d4, d5 and d6 can be adjusted either by adjusting the corresponding threaded connections on the couplers 50 and 52, or by adjusting the lengths of the tubes 60, 62 and 64 in the manner described previously.

To further insure that the images received by each of the video cameras 14, 16 and 18 are co-registered with one another, each of the cameras 14, 16 and 18 is preferably mounted by means of a corresponding one of a plurality of clamping collars 78, 80 and 82, which permit rotational adjustment of the cameras relative to the object image beam. This arrangement accommodates very slight angular deviations of the camera CCD arrays which occur due to variations within the tolerances specified by the manufacturer.

In the specific application of the system 10 to providing images for plant stress analysis, the first filter 72 is selected to be a narrow bandpass filter which passes only light of 700 nm wavelength to the CCD array in the first camera 14. As discussed previously, 700 nm is the wavelength which chlorophyll in the plant absorbs, and since plant stress is directly related to chlorophyll production, a variation in the plant's absorption, and thus reflectance, of 700 nm wavelength light is an indicator of plant stress. However, the reflectance of this wavelength will also vary in response to various environmental conditions, such as ambient light. Thus, a reference wavelength must also be imaged which is not responsive to chlorophyll production in the plant. In this instance, an infrared wavelength, such as 840 nm, can be employed as a reference, and thus, the second filter 74 selected to be a narrow bandpass filter which passes only 840 nm wavelength light to the CCD array in the second camera 16. Finally, the third filter 76 is selected to be a wide bandpass filter which passes the visible spectrum of wavelengths to the third camera 18, and thus provides a visible image which can be overlaid with the images generated by the first and second cameras 14 and 16 to facilitate a visual observation of the plant stress measurements.

The image signals generated by each of the cameras 14, 16 and 18 are passed to a suitable image processing system (not shown), which performs the necessary comparison of the chlorophyll production responsive image generated by the first camera 14 and the reference image generated by the second camera 16, and generates a visual indication of plant stress which is overlaid with the visual spectrum image generated by the third camera 18. It should be understood that use of the system 10, which insures automatic co-registration of the three generated images, greatly reduces the amount of data processing which must be carried out to correlate each pixel of each image. Without the automatic co-registration, extensive processing of the image data would be necessary to first match the corresponding portions of each image with one another, and then carry out the various image analysis functions.

In summary, the imaging system 10 provides two distinct advantages over prior art multi spectral imaging systems. First, the adjustability of the various system components enables each of the images received by the cameras to be automatically co-registered with one another, thus greatly reducing post image processing. Second, the modularity of the system 10 and the use of off-the-shelf components therein facilitates easy reconfiguration of the system 10 for adapting it for use in any desired application.

Although the invention has been disclosed in terms of a preferred embodiment, it will be understood that numerous modifications and variations could be made thereto without departing from the scope of the invention as defined in the following claims. For example, while most envisioned applications of the system 10 involve the generation of co-registered multi spectral images, the system 10 could also be employed for other purposes, such as generation of co-registered time lapse images. In this application, each of the cameras 14, 16 and 18 would receive the same image (i.e., the filters 72, 74 and 76 would either not be used or would be all of the same type), however, the cameras in the system would be controlled in such a manner that each one of them generates an image at a different instant in time so that a time lapse sequence of images is generated which can be combined in a single co-registered image.

What is claimed is:

1. An imaging system for generating automatically co-registered images of an object comprising:

a) a lens assembly for forming a real image of an object at a focal point;

b) a collimating lens for receiving said real image from said focal point, and generating a collimated image beam;

c) a beam splitter assembly positioned to receive said collimated image beam, and split said collimated image beam into at least first and second image beams;

d) first and second tubes having first ends attached to said beam splitter assembly, and having second ends;

e) first and second optical imaging devices attached, one each, to said second ends of said first and second tubes, respectively, for receiving said first and second image beams, respectively; and f) means for adjusting the lengths of said first and second tubes so that the images received by said first and second optical imaging devices are co-registered with one another.

2. The system of claim 1, further comprising a first wavelength selective filter disposed in a path of said first image beam and a second wavelength selective filter disposed in a path of said second image beam, for selectively filtering the images received by said first and second optical imaging devices, respectively.

3. The system of claim 1, wherein said beam splitter assembly further comprises:

1) a first beam splitter positioned to receive said collimated image beam, and split said collimated image beam into a transmitted image beam, and a reflected image beam; and 2) a fold mirror positioned to receive said reflected image beam, and form a twice reflected image beam;

wherein, said transmitted image beam and said twice reflected image beam are projected through said first and second tubes, respectively, and comprise said first and second image beams, respectively.

4. The system of claim 3, wherein said beam splitter assembly comprises a modular assembly of a plurality of cubes which are connected to one another by at least one coupling, with said first beam splitter being disposed in a first of said cubes, and said fold mirror being disposed in a second of said cubes.

5. The system of claim 4, wherein said first beam splitter and said fold mirror are adjustably mounted in said first and second cubes, respectively.

6. The system of claim 3, wherein said beam splitter assembly further comprises:

3) a second beam splitter for receiving said reflected image beam, and generating a second, transmitted image beam which is directed to said fold mirror, and a second, twice reflected image beam; and, said system further comprises a third tube having a first end attached to said second beam splitter and a second end attached to a third optical imaging device for receiving said second, twice reflected image beam from said second beam splitter.

7. The system of claim 3, wherein said first beam splitter is formed from a dichroic mirror having wavelength selective filtering characteristics.

8. The system of claim 1, wherein said first and second optical imaging devices further comprise first and second CCD cameras.

9. The system of claim 1, wherein said lens assembly further comprises:

1) a reticle positioned at said focal point; and 2) a focusing lens for focusing said real image on said reticle.

10. The system of claim 1, wherein said first and second optical imaging devices are rotatably adjustable relative to said beam splitter assembly to facilitate rotational registration adjustment of the images received by said first and second cameras.

11. A method for generating multiple co-registered optical images comprising the steps of:

a) focusing a real image of an object to be imaged on a focal point;

b) projecting said real image from said focal point through a collimating lens to form a collimated image beam;

c) directing said collimated image beam through a beam splitter, and thereby splitting said collimated image beam into a first, transmitted image beam, and a second, reflected image beam;

d) directing said second, reflected image beam to a fold mirror for generating a third, reflected image beam;

e) directing said first, transmitted image beam through a first lens tube to a first optical imaging device for receiving a first image of said object;

f) directing said third, reflected image beam from said fold mirror through a second lens tube to a second optical imaging device for receiving a second image of said object; and g) co-registering said first and second images of said object by adjusting the lengths of said first and second lens tubes.

12. The method of claim 11, wherein said step of directing said collimated image beam further comprises directing said collimated image beam through a wavelength selective dichroic mirror beam splitter to form a first, transmitted image beam containing only radiation wavelengths in a first range, and a second, reflected image beam containing only radiation wavelengths in a second range.

13. The method of claim 11, further including the step of rotationally adjusting said first and second optical imaging devices relative to said first and second image beams until said first and second images are co-registered with one another.

14. The method of claim 11, further comprising the step of wavelength filtering said first and third image beams before they are received by said first and second optical imaging devices, respectively.

15. The method of claim 14, wherein said step of filtering is carried out by placing first and second wavelength selective filters in image beam paths of said first and third image beams, respectively.

16. The method of claim 11, wherein said step of focusing a real image comprises directing an image of an object through a focusing lens and onto a reticle positioned at said focal point.

* * * * *